March 10, 1964 R. POSPISCHIL 3,124,767

DOUBLE BALANCED MODULATOR

Filed Feb. 27, 1962

3,124,767

DOUBLE BALANCED MODULATOR

Reginhard Pospischil, Munich, Germany, assignor to Siemens & Halske Aktiengesellschaft, Berlin and Munich, a corporation of Germany Filed Feb. 27, 1962, Ser. No. 175,948
Claims priority, application Germany Mar. 2, 1961
2 Claims. (Cl. 332—47)

Figure 1:
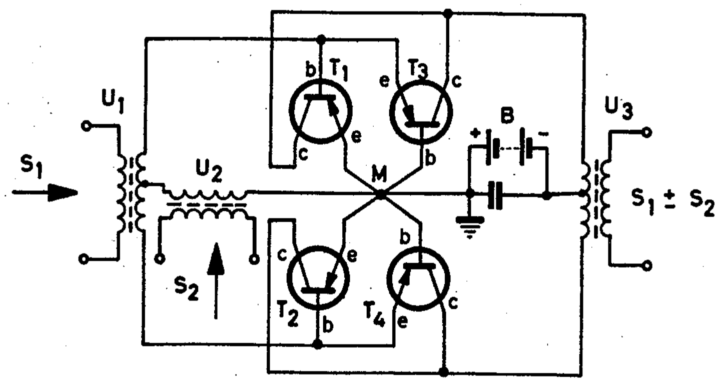

The invention disclosed herein relates to a double balanced modulator having high linearity and low sideband attenuation, and is particularly concerned with a double balanced modulator comprising transistors for mutually modulating two signals, wherein a modulated signal is obtained in the collector circuit of the transistors and wherein the two signals are extended to four transistors of the identical conductivity type.

The following problems appear in the dimensioning of modulation circuits for carrier frequency systems with wide transmission bands:

(1) The input level at the modulator shall be as low as possible on account of non-linearity.

(2) The output level of the modulator shall be as high as possible in view of the fundamental noise of the succeeding modulation amplifier.

(3) The sideband attenuation of the double balanced modulator with passive modulation elements is freely selectible only in a limited sense. The sideband attenuation is composed of the basic attenuation which is with loss-free elements affected by the switching function and the attenuation resulting from losses of the modulation elements and the linearizing resistors. In the case of a very great switching ratio, the loss attenuation increases with the decrease of the apparent resistance which can for technical reasons be realized with given bandwidth and frequency position. The distortion factor increases when a part of the sidebands is reflected at the end of the modulator. In the case of extreme linearity requirements, a further attenuation must be introduced so as to reduce the reflection or else, the filter which succeeds the modulator must be fairly matched for all sidebands.

Various known modulator circuits employ tubes, diodes or transistors as non-linear elements. Double balanced modulators are likewise known, employing four transistors with the same conductivity type, such modulators requiring, however, complicated input and output transformers which are respectively provided with a plurality of symmetrically constructed windings; moreover, such modulators do not have the frequently required high freedom of reaction between the output and input terminals. This deficient freedom from reaction becomes noticeable, just as in the case of ring modulators, at least in a higher distortion factor, because the sidebands which are reflected at the output, for example, in the case of successively arranged simple single band filters, influence the control of the non-linearities.

There is also known a modulator circuit with four transistors of the same conductivity type, which exhibits high reaction freedom, but which has the disadvantage of requiring three symmetrically constructed transformers. The drawback is particularly noted in connection with high frequencies since transformers with symmetrically constructed windings, as would be required, can be realized only with difficulties, and since the symmetrical transformer cannot be replaced by symmetrical ohmic voltage dividers for reasons of economical utilization of the carrier frequency generators.

A modulation circuit has become known, intended to avoid complicated transformers in connection with transistor modulators, such circuit comprising a set of opposingly operating junction transistors of opposite conductivity type. This transistor modulator also has the previously noted drawbacks with respect to the freedom from reaction. Another disadvantage of such a modulator circuit resides in the fact that it is in the case of transistors with opposite conductivity type more difficult to obtain identical characteristic response than it is in the case of transistors of the same conductivity type.

The object of the invention is to produce a modulator having high linearity and low sideband attenuation.

In order to realize this object and to avoid the previously noted disadvantages of the prior modulator circuits, the modulator is according to the invention so constructed that each two of four transistors form a pair in which the collectors are directly interconnected, the base electrode of one of the transistors of the respective pair being connected directly or over linearizing resistors with the emitter electrode of the other transistor, one emitter-base connection of one pair being connected with an emitter-base connection of the other pair, and wherein one signal is extended, over a first transformer with symmetrical secondary winding, to the two other base-emitter through connections while the other signal is extended, over a second transformer with non-symmetrical construction, to the mid-point of the secondary winding of the first transformer and the common point respectively of one base- or emitter electrode of all four transistors; the modulated signal being obtained from the through connection of the collectors over an output transformer with symmetrical primary winding, thereby extending the collector direct voltage between the center point of the symmetrical primary winding of the output transformer and the center point of the symmetrical secondary winding of the first transformer or the common base-emitter through connection of all four transistors.

In this construction of the modulator, the two signals which are to be mutually modulated are decoupled and conducted to the emitter-base paths of the transistors, while the modulated signal is decoupled at the collectors, thereby avoiding reaction of the voltages lying at the output on the control operation of the transistors. Another advantage of the special construction of the circuit resides in the fact that the two signals can be conducted to the modulator non-symmetrically. Only two of the three required transformers are provided with symmetrical windings.

Further details of the invention will appear from the description which is rendered below with reference to the accompanying drawing showing in FIGS. 1 and 2 embodiments thereof.

FIG. 1 shows a double balanced modulator circuit comprising four transistors $T_1 \ldots T_4$ with identical conductivity type for mutually modulating two signals $S_1$ and $S_2$. The collectors of the transistors $T_1$ and $T_3$ as well as $T_2$ and $T_4$ are directly interconnected. The base of the transistor $T_1$ is connected with the emitter of the transistor $T_3$ and the base of the transistor $T_2$ is connected with the emitter of the transistor $T_4$. The remaining electrodes of the transistors $T_1$ to $T_4$, namely, the emitter of the transistors $T_1$ and $T_4$ and the bases of the transistors $T_3$ and $T_4$ are likewise directly interconnected, thus resulting in a common mid-point M for the electrodes. The input signal $S_1$ is extended over the transformer $U_1$. The secondary winding of the transformer $U_1$ is constructed as a symmetrical winding which is on the one hand connected with the base of the transistor $T_1$ and with the emitter of the transistor $T_3$, and on the other hand with the base of the transistor $T_2$ and with the emitter of the transistor $T_4$. The through connections of the collectors of the transistors $T_1$ and $T_3$ as well as $T_2$ and $T_4$ are extended to the symmetrically constructed primary winding of the output transformer $U_3$ at the secondary winding of which are obtained the modulation products $S_1 \pm S_2$.

The second signal $S_2$ is supplied over the non-symmetrically constructed transformer $U_2$, the secondary winding of such transformer being disposed between the mid-point of the secondary winding of the transformer $U_1$ and the mid-point M which is common for all transistors $T_1 \ldots T_4$.

The power supply B for the operation of the transistors $T_1 \ldots T_4$ is effected between the common mid-point M and a mid-point tap of the primary winding of the output transformer $U_3$. The common mid-point M can be grounded.

Figure 2:
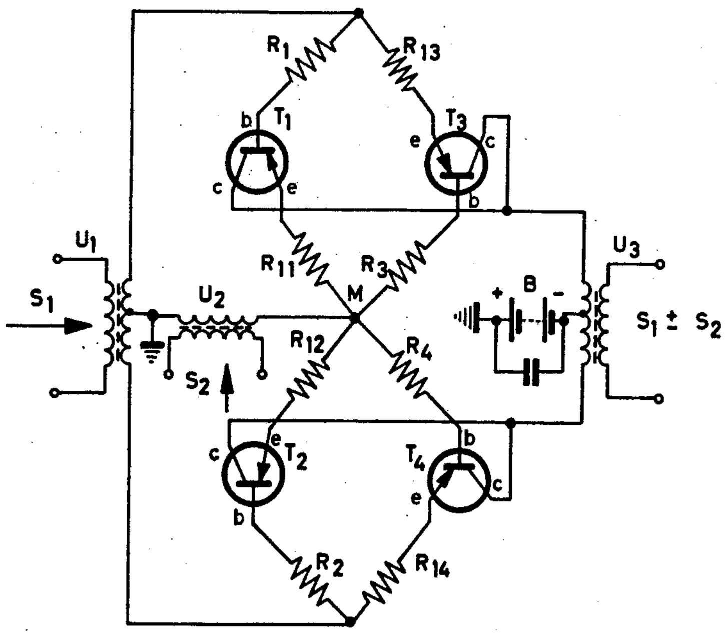

FIG. 2 shows a modified embodiment of the invention represented in FIG. 1, like parts being indicated by like reference numerals. The collectors of the transistors $T_1$, $T_3$ and $T_2$, $T_4$ are again directly interconnected. Linearizing resistors $R_1$, $R_2$, $R_3$, $R_4$, $R_{11}$, $R_{12}$, $R_{13}$, $R_{14}$ are inserted in the remaining through connections of the transistors $T_1 \ldots T_4$. Another difference as compared with FIG. 1 resides in that the current supply is connected between the mid-point of the secondary winding of the transformer $U_1$ and the mid-point of the primary winding of the transformer $U_3$, whereby the mid-point tap of the transformer $U_1$ can be connected to ground.

The manner of operation of both circuit arrangements according to FIGS. 1 and 2 is the same in every respect. The operation of the circuit arrangement may be described in detail as follows:

In double balanced modulators, the carrier and the signal containing the intelligence, can be interchanged. It will first be assumed that $S_1$ is the signal and $S_2$ is the carrier.

The transistors $T_1$ to $T_4$ respectively having an emitter electrode *e*, a base electrode *b* and a collector electrode *c*, represent non-linear amplifiers, the transistors $T_1$ and $T_2$ operating in emitter circuit (the emitter electrode *e* being common to the input- and output circuit), while the transistors $T_3$ and $T_4$ operate in base circuit (the base electrode *b* being common to the input- and output circuit).

Depending upon the polarity of the carrier current which is conducted to the transformer $U_2$, either the transistors $T_1$ and $T_2$ are conductive and the transistors $T_3$ and $T_4$ are blocked, or vice-versa. (In the embodiment, there are used p-n-p transistors which are conductive when the base *b* is negatively biased with respect to the emitter *e* and are blocked when the base *b* is positively biased with respect to the emitter *e*.) For example, if carrier current flows in one half wave through the secondary winding of $U_2$ in the direction to the common central point M, both transistors $T_1$ and $T_2$ which operate in emitter circuit, carry current. In the other half wave of the carrier, the two transistors $T_3$ and $T_4$, which operate in base circuit, carry current. With respect to the signal $S_1$, the transistors $T_1$, $T_2$ and $T_3$, $T_4$ are connected in opposition. The signal in the output circuit has thereby the opposite polarity as in the input circuit, when $T_1$ and $T_2$ carry current (base and collector current are in opposite phase in case of the emitter circuit), while the signal has the same polarity in the input and output circuit when $T_3$ and $T_4$ carry current (emitter and collector current are in phase in case of the base circuit). This means, however, that the polarity of the signal in the output circuit is changed in the rhythm of the carrier frequency, exactly as is the case with a ring modulator. Accordingly, the output voltage of the double balanced modulator contains substantially only the two side oscillations $\Omega \pm \omega$ (wherein $\Omega$ indicates the carrier frequency and $\omega$ the signal frequency), while the carrier and the signal oscillations are suppressed.

Assuming that $S_1$ represents the carrier and $S_2$ the signal, the transistors $T_1$ (emitter circuit) and $T_4$ (base circuit) carry current, during one half cycle of the carrier, when the carrier current traverses the secondary winding of the transformer $U_1$ from top to bottom, while the transistors $T_2$ and $T_3$ are blocked. In the other half cycle of the carrier, the transistors $T_3$ (base circuit) and $T_2$ (emitter circuit) carry current, and the transistors $T_1$ and $T_4$ are blocked. Consequently there is always one amplifier operating in emitter circuit with an amplifier in base circuit, the signal being extended with the same phase. A change of polarity of the signal is effected, as in the first case, in the output circuit, by the alteration of the transistors operating in emitter and base circuit, which is effected in the rhythm of the carrier frequency.

Ohmic voltage dividers may be substituted for the transformers $U_1$ and $U_3$ in both embodiments.

Changes may be made within the scope and spirit of the appended claims which define what is believed to be new and desired to have protected by Letters Patent.

I claim:

1. A double balanced modulator for the mutual modulation of two signals, comprising, disposed in two pairs, four transistors of identical conductivity type, means for directly interconnecting the collectors of each pair of transistors, means for connecting the base electrode of one transistor of each pair with the emitter of the other transistor of such pair, means for connecting the emitter-base connection of one of said pairs of transistors with an emitter-base connection of the other pair, means for conducting one signal over a first transformer with symmetrical secondary winding to the two other base-emitter connections, means for conducting the second signal over a second transformer with non-symmetrical construction to the center point of the secondary winding of the first transformer and the common point of the respective base-emitter connections of all four transistors, means for obtaining the modulated signal in a circuit including the collectors of said transistors over an output transformer having a symmetrical primary winding, and a direct current source operatively connected between the mid-point of the symmetrical primary winding of said output transformer and the mid-point of the symmetrical secondary winding of said first transformer.

2. A double-balanced modulator for the mutual modulation of two signals, comprising four transistors of identical conductivity type, disposed in two pairs, a D.-C. collector supply source, a linearization resistor in the base circuit and the emitter circuit of each transistor, means for directly interconnecting the collectors of each pair of transistors, means for connecting the base electrode of one transistor of each pair with the emitter of the other transistor of such pair via said linearization resistors, means for connecting the connecting point of the linearization resistors of the base-emitter connection of one of said pairs of transistors with the corresponding point of the other pair, means for conducting one signal over a first transformer having a symmetrical secondary winding, the opposite sides of which are connected to the connecting points of the linearization resistors of the other base-emitter connections, means for conducting the second signal over a second transformer with non-symmetrical construction, having a secondary winding connected to the center-tap of the secondary winding of the first transformer and the common point of the respective base-emitter connections of all four transistors, means for obtaining the modulated signal over an output transformer having a symmetrical primary winding, opposite sides of which are connected to the respective pairs of collectors of said transistors, and means for connecting said D.-C. collector supply source between the center-tap of the symmetrical primary winding of said output transformer and the center-tap of the symmetrical secondary winding of said first transformer.

References Cited in the file of this patent

FOREIGN PATENTS

| | | |
|---|---|---|
| 1,125,813 | France | July 16, 1956 |
| 1,145,796 | France | May 13, 1957 |